United States Patent

Simons et al.

[11] Patent Number: 5,092,270
[45] Date of Patent: Mar. 3, 1992

[54] CARRIER CAGE FOR CATS OR OTHER SMALL ANIMALS

[76] Inventors: Stephen K. Simons, 2001 N. 250 West, Apt. 2, Sunset, Utah 84015; John W. Smith, 942 E. 3250 North, Layton, Utah 84040

[21] Appl. No.: 632,146
[22] Filed: Dec. 21, 1990
[51] Int. Cl.⁵ .............................................. A01K 29/00
[52] U.S. Cl. ........................................ 119/19; 119/165
[58] Field of Search ................ 119/17, 19, 161, 165, 119/15

[56] References Cited

U.S. PATENT DOCUMENTS

| | | | |
|---|---|---|---|
| 3,246,630 | 4/1966 | Dearing et al. | 119/165 |
| 3,487,814 | 1/1970 | Ingebritsen | 119/19 |
| 3,618,568 | 11/1971 | Breeden | 119/165 |
| 4,021,975 | 5/1977 | Calkins | 119/19 |
| 4,696,257 | 9/1987 | Neary | 119/19 |
| 4,696,259 | 9/1987 | Fewox | 119/19 |

FOREIGN PATENT DOCUMENTS 2619487  2/1989  France ................................ 119/19

Primary Examiner—John G. Weiss
Attorney, Agent, or Firm—Mallinckrodt & Mallinckrodt

[57] ABSTRACT

The carrier cage of the invention is dual compartmented, with an open-walled living compartment at one end and a closed-walled sanitation compartment at the opposite end divided by a position having a passageway therethrough for arrival movement between the two compartments. The sanitation compartment is provided with a removable litter box preferably located under an apertured floor with provision for moving the litter box as a drawer. Space under the floor of the living compartment may be used to store grooming and other useful articles.

12 Claims, 3 Drawing Sheets

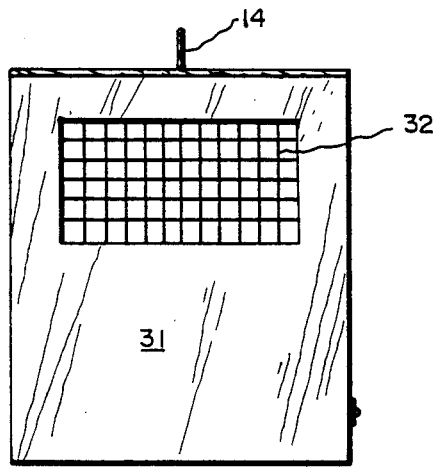
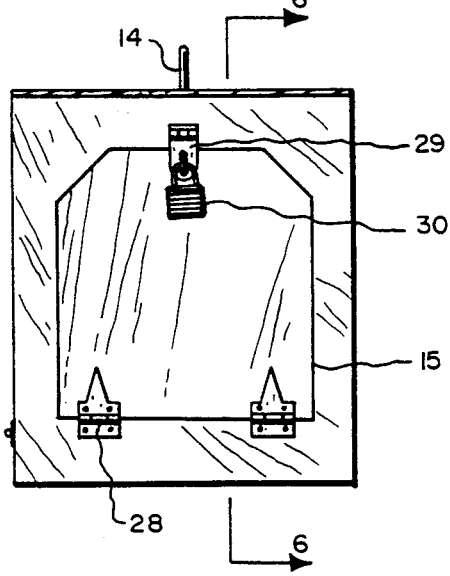
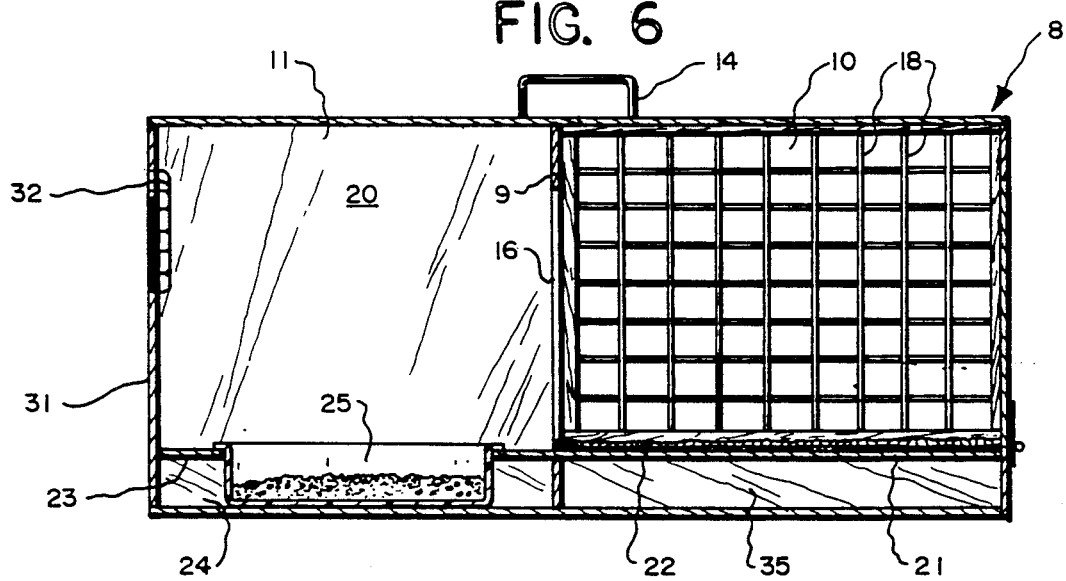

CARRIER CAGE FOR CATS OR OTHER SMALL ANIMALS

BACKGROUND OF THE INVENTION

1. Field

This invention is in the field of portable carriers, for small animals.

2. State of the Art

Travel carriers of cage type for cats and other small animals are well-known in the art. These usually comprise a single compartment that is open to the atmosphere. While such arrangement is desirable and even necessary for ventilation and safety purposes, some animals, particularly cats, require seclusion for brief or extended periods during the travel. Failure to allow for the animal's privacy results in discomfort and even extreme pain, thus making the trip unpleasant not only for the animal but also for those who must care for it and listen to its complaints.

Cages which allow for privacy of the animal are not new and usually comprise a facility with two or three rooms. These are often termed cat hotels. However, these are too large and bulky to take on a trip by air or in a crowded automobile. Such cages are usually meant for permanent habitation and exceed the space and weight restrictions imposed by airlines and other travel facilities.

SUMMARY OF THE INVENTION

The carrier of the invention is a portable, two compartment, animal cage having a first compartment, which is open visually and for ventilation, and a second compartment which is closed to keep the animal secluded from public view. The second compartment has a removable litter box, preferably withdrawable as a drawer, under the floor of the compartment which is apertured thereover. An odor filter is also preferably provided in an appropriate manner. A handle is firmly attached to the top of the cage, preferably intermediate in a manner similar to a small suitcase or briefcase.

The two compartments share a common solid wall in which a passageway is provided. The open compartment has two opposite side walls formed by bars, screen, or wire mesh, and a solid end wall with a hinged and lockable door. Storage space may be located directly beneath the floor of this open compartment. The seclusion compartment is almost entirely closed by solid walls.

THE DRAWINGS

In the drawings, which illustrate the best mode presently contemplated for carrying out the invention in actual practice:

FIG. 1, represents a perspective view looking toward the front of the carrier cage of the invention;

FIG. 2, a front elevational view;

FIG. 3, a horizontal section taken on the line 3—3 of FIG. 2, hidden parts being indicated by broken lines;

FIG. 4, a left side elevational view taken from the standpoint of FIGS. 2 and 3;

FIG. 5, a similar view, but of the right side; and

FIG. 6, a longitudinal vertical section taken along the line 6—6 of FIG. 5.

DETAILED DESCRIPTION OF THE ILLUSTRATED EMBODIMENT

Figure 3:
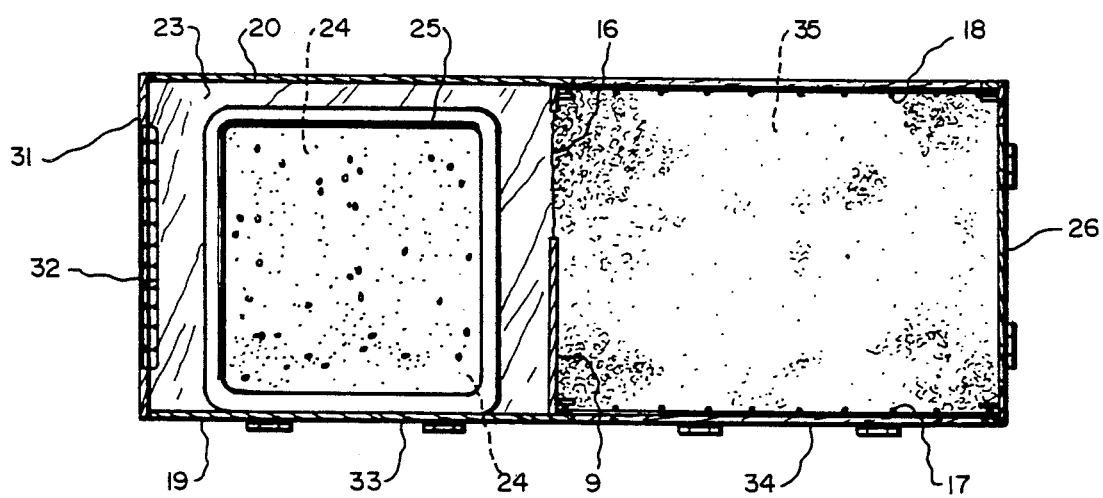

In the form illustrated, the carrier cage of the invention is intended primarily for cats. It comprises an elongate, box-like structure 8 divided by a partition wall 9, FIGS. 3 and 6, into a visually open, animal-living compartment 10 and a substantially closed, animal-sanitation compartment. A base structure 12 extends under both compartments, which are preferably on the same level. A roof 13 extends over both compartments. A carrying handle 14 is attached to the roof preferably equidistant from opposite ends thereof, and a doorway 15 at one closed end of the structure provides for ingress into and egress out of the structure. A passageway 16 in partition wall 9 provides for movement between compartments 10 and 11 by the small animal caged within the structure 8.

Open compartment 10 is formed by opposite side wall portions 17 and 18 of the structure that are of wire mesh having the wires thereof coated with a relatively soft material such as rubber or a suitable plastic. These side wall portions adjoin and are in effect continuations of opposite side wall portions 19 and 20, respectively, of closed compartment 11. Base structure 12 provides a raised floor 21, FIG. 6, for compartment 10, which is desirably covered with padding, carpeting, or other soft material 22 for the animal's comfort, and a similarly raised but apertured floor 23 marginal to a recess 24 provides for animal access to a removable litter box 25 that is desirably slidable in and out of the base structure as a drawer.

Doorway 15 is formed in an end wall 26 of the structure and leads directly into compartment 10. It is closed by a door 27, which is preferably perforate as shown and hinged at 28 to swing open downwardly. Locking means in the form of a hasp 29 with padlock 30 are provided for safety reasons.

Compartment 11 is preferably about the same size as compartment 10. In addition to its previously mentioned side walls 19 and 20, it is closed by an end wall 31 of the cage structure. A standard, disposable-type of odor filter (not shown) is inserted into a wire mesh receptacle 32 provided as part of end wall 31.

Figure 1:
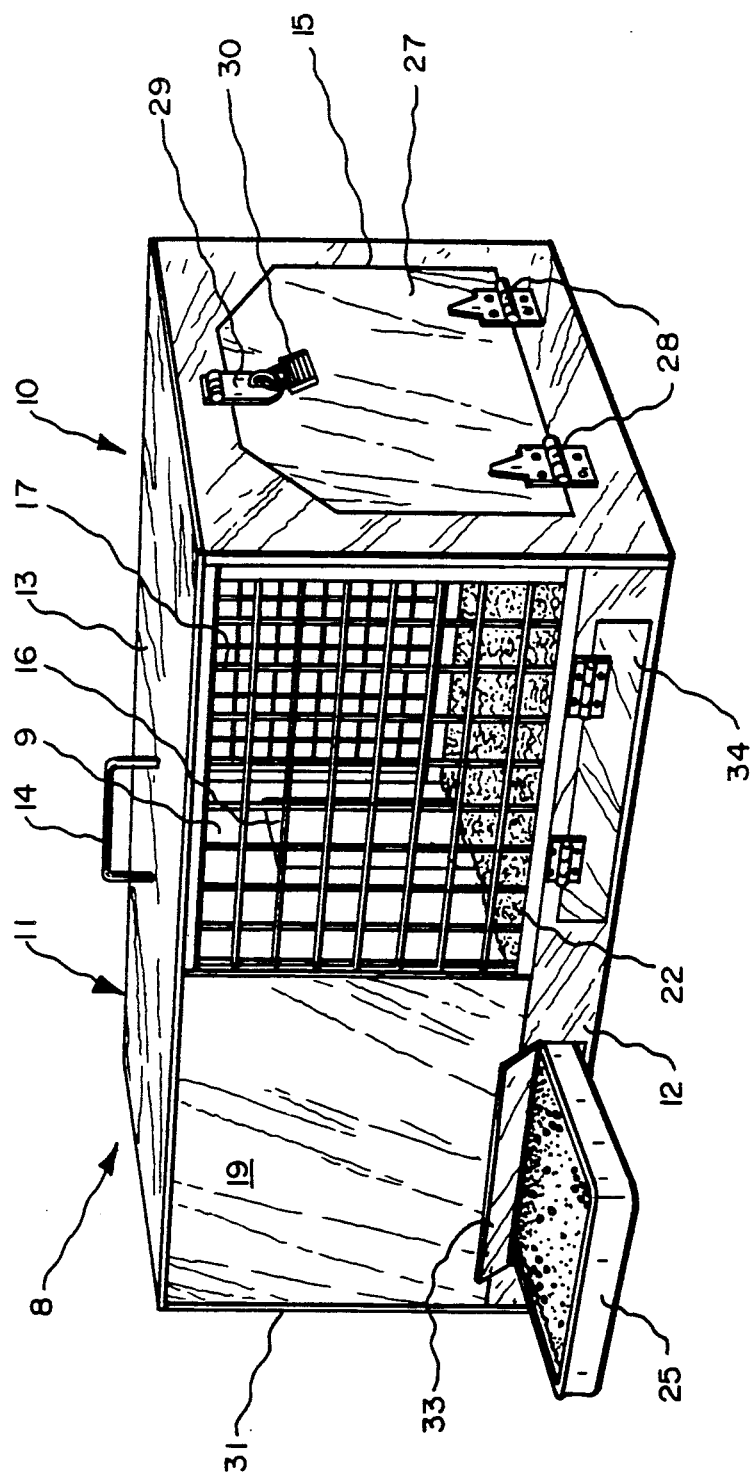
Figure 2:
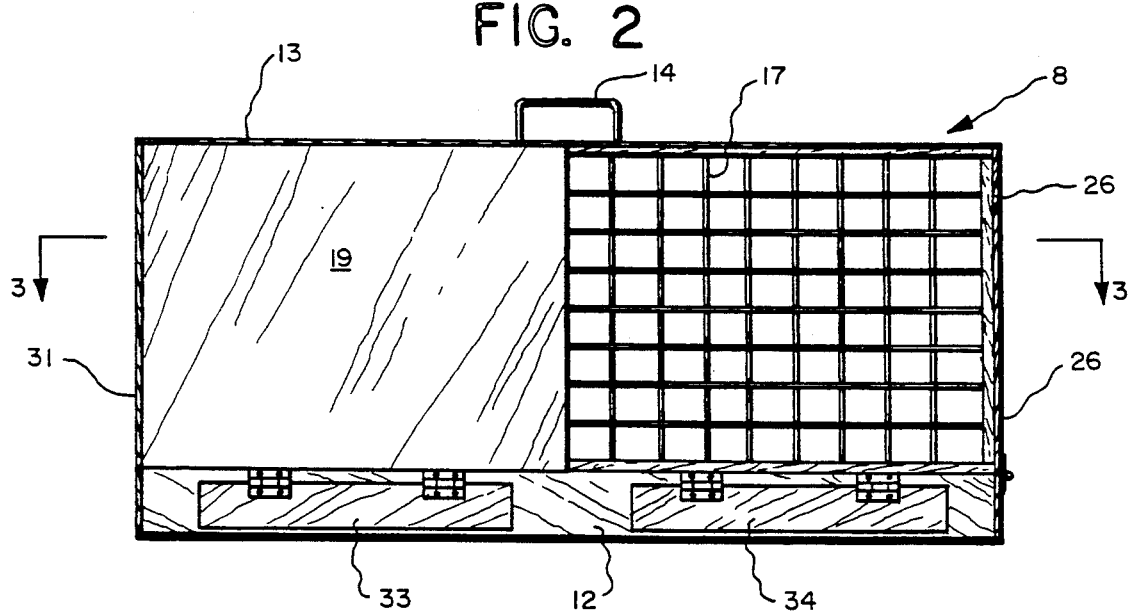

Base structure 12 is preferably provided with an elongate, hinged door 33 extending longitudinally of the structure along compartment 11 so as to normally cover the otherwise open end of the litter box receiving recess 24 and to provide access to the litter box 25 for pulling it out at appropriate times as shown in FIG. 1 to empty it. Likewise, base structure 12 is preferably provided with a similar door 34 along compartment 10 for providing access to space 35 under floor 21 for the storage of grooming and other useful articles.

If desired, door 33 may be combined with litter box 25 as the front of an actual drawer and door 34 may be similarly combined with a storage drawer structure.

While the visually open, animal living compartment 10 has been shown with open walls of a wire mesh, such walls could be made of a transparent plastic with ventilation openings formed therein, or such ventilation openings could be formed in other portions of the compartment.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A dual compartment carrier cage for small animals, comprising a cage structure having a first, animal-living compartment open for viewing and ventilation purposes, and a second, animal-sanitation compartment substantially closed for privacy; a structural base for said compartments providing a raised floor for said second compartment which is apertured for sanitation purposes; and a litter box below the aperture in said floor and arranged for withdrawal from and replacement in said base in the manner of a drawer.

2. A carrier cage according to claim 1, wherein the raised floor of the base extends under the first compartment; and there is storage space within said base below said first compartment.

3. A carrier cage according to claim 1, wherein the cage structure has a roof that extends over both compartments.

4. A carrier cage according to claim 3, wherein a handle for carrying purpose is provided intermediate the length of the roof.

5. A carrier cage according to claim 1, wherein the cage structure has a partition wall dividing said compartments from each other and having a passageway therethrough for animal movement from one to the other of said compartments.

6. A carrier cage according to claim 1, wherein the cage structure has opposite end walls substantially closing the first and second compartments, respectively, and has side walls having mutually opposite, open wall portions along the first compartment and mutually opposite, closed wall portions along the second compartment.

7. A carrier cage according to claim 6, wherein the opposite, open wall portions of the side walls and the opposite, closed portions thereof are substantially rectilinear extensions of each other.

8. A carrier cage according to claim 6, wherein a doorway and door are provided in the end wall that substantially closes the first compartment.

9. A carrier cage according to claim 8, wherein odor filter means are provided in the end wall that substantially closes the second compartment.

10. A carrier cage according to claim wherein the structural base is provided with a hinged door opening into the litter box so said litter box may be withdrawn and replaced in the manner of a drawer.

11. A dual compartment carrier cage for small animals, comprising a living compartment that is at least partially open-walled for viewing and ventilation purposes; an adjoining sanitation compartment that is substantially closed-walled, the two compartments intercommunicating for animal movement from one to the other; a removable and replaceable litter box opening into said sanitation compartment for sanitary use by the animals; and a carrying handle for the carrier cage.

12. A carrier cage according to claim 11, wherein access is provided adjacent to the bottom of the sanitation compartment for removal and replacement of the litter box in the manner of a drawer.

* * * * *

UNITED STATES PATENT AND TRADEMARK OFFICE
CERTIFICATE OF CORRECTION

PATENT NO. : 5,092,270

DATED : March 3, 1992

INVENTOR(S) : Stephen K. Simons and John W. Smith

It is certified that error appears in the above-identified patent and that said Letters Patent is hereby corrected as shown below:

```
In the Claims, Column 4, Line 15, insert --1-- between "claim"
   and "wherein".
```

Signed and Sealed this

Twenty-ninth Day of June, 1993

Attest:

MICHAEL K. KIRK

Attesting Officer

Acting Commissioner of Patents and Trademarks